US006270813B1

(12) United States Patent
Nielsen et al.

(10) Patent No.: US 6,270,813 B1
(45) Date of Patent: Aug. 7, 2001

(54) PREPARATION OF DOUGH AND BAKED PRODUCTS

(75) Inventors: Jack Beck Nielsen, Hellerup; Thomas Schäfer, Farum, both of (DK)

(73) Assignee: Novozymes A/S, Bagsuaerd (DK)

( * ) Notice: Subject to any disclaimer, the term of this patent is extended or adjusted under 35 U.S.C. 154(b) by 0 days.

(21) Appl. No.: 09/536,539

(22) Filed: Mar. 28, 2000

(30) Foreign Application Priority Data

Mar. 30, 1999 (DK) .............................................. 1999 00432

(51) Int. Cl.⁷ ...................................................... A21D 2/00
(52) U.S. Cl. .................... 426/20; 426/61; 426/62; 426/63; 426/549; 426/558; 426/653
(58) Field of Search ................................. 426/20, 61, 62, 426/63, 549, 558, 653; 435/202, 814, 816

(56) References Cited

U.S. PATENT DOCUMENTS

| | | | |
|---|---|---|---|
| 4,299,848 | * 11/1981 | De Stafanis et al. .................. | 426/20 |
| 4,654,216 | * 3/1987 | Carroll et al. ......................... | 426/20 |
| 5,409,717 | * 4/1995 | Apicella et al. ....................... | 426/19 |
| 5,698,245 | 12/1997 | Tanaka et al. ......................... | 426/10 |
| 6,126,628 | * 12/2000 | Cherry et al. ......................... | 435/202 |
| 6,197,352 | * 3/2001 | Olesen .................................. | 426/20 |

FOREIGN PATENT DOCUMENTS

| | | |
|---|---|---|
| 0 412 607 A1 | 2/1991 | (EP) . |
| 0 686 348 A1 | 12/1995 | (EP) . |
| WO 91/04669 | 4/1991 | (WO) . |
| WO-91/04669-A1 | * 4/1991 | (WO) . |
| WO-00/59307-A1 | * 10/2000 | (WO) . |

OTHER PUBLICATIONS

Y. Suzuki et al., "Purification and Characterization of a Malto–triogenic Alpha–Amylase I and a Maltogenic Alpha–Amylase II Capable of Cleaving Alpha–1,6–Bonds in Amylopectin", pp. 246–252. Jun. 1987.

Min et al., (1998) J. Agric. Food Chem. 46(2):779–782.

* cited by examiner

*Primary Examiner*—Nina Bhat
(74) *Attorney, Agent, or Firm*—Elias J. Lambiris, Esq.; Jason I. Gargell, Esq.

(57) ABSTRACT

A process for preparing a dough or a baked product comprises adding an amylase to the dough in an amount which is effective to retard the staling of the bread. The amylase is an exo-amylase which hydrolyzes starch to form mainly mal-totriose.

18 Claims, No Drawings

PREPARATION OF DOUGH AND BAKED PRODUCTS

CROSS-REFERENCE TO RELATED APPLICATIONS

This application claims priority under 35 U.S.C. 119 of Danish application PA 1999 00432 filed Mar. 30, 1999, the contents of which are fully incorporated herein by reference.

FIELD OF THE INVENTION

The invention relates to the retardation of staling of baked products during storage.

BACKGROUND OF THE INVENTION

Staling of baked products (such as bread) has been recognized as a problem which becomes more serious as more time lies between the moment of preparation of the bread product and the moment of consumption. The term staling is used to describe changes undesirable to the consumer in the properties of the bread product after leaving the oven, such as an increase of the firmness of the crumb, a decrease of the elasticity of the crumb, and changes in the crust, which becomes tough and leathery.

The firmness of the bread crumb increases further during storage up to a level, which is considered as negative. The increase in crumb firmness, which is considered as the most important aspect of staling, is recognized by the consumer a long time before the bread product has otherwise become unsuitable for consumption The prior art suggests to retard the staling by the addition to the dough of various amylases, such as glucoamylase (amyloglucosidase) which hydrolyzes starch to form glucose (G1); soybean beta-amylase which hydrolyzes starch to form maltose (G2); alpha-amylase which hydrolyzes starch in an endo manner; or pullulanase which hydrolyzes alpha-1,6 bonds in an endo manner. WO 91/04669 discloses the use of a maltogenic amylase from *B. stearothermophilus* to retard staling.

The enzyme is commercially available from Novo Nordisk A/S under the tradename Novamyl®. U.S. 5,698,245 discloses the use of certain maltotriose-forming enzymes to improve the quality of bread, including the prevention of bread solidification, particularly when frozen dough is used.

SUMMARY OF THE INVENTION

The invention provides a process for preparing a dough or a baked product prepared from the dough which comprises adding an amylase to the dough in an amount which is effective to retard the staling of the bread, wherein said amylase:
  a) hydrolyzes starch to form an initial hydrolysis product which comprises maltotriose in an amount which is at least 20% of the total maltooligosaccharides of 2–10 glucose units,
  b) hydrolyzes amylose so that the average molecular weight of the amylose after 0.4–4% hydrolysis is more than 50% of the molecular weight before the hydrolysis, and
  c) has a temperature optimum in the range of 55–95° C. in the presence of starch.

The invention also provides a dough comprising said amylase and a premix comprising flour together with said amylase. Finally, the invention provides an enzymatic baking additive, which contains said amylase.

The use of the amylase in accordance with the present invention provides an improved anti-staling effect as measured by, e.g. less crumb firming, retained crumb elasticity, improved slice-ability (e.g. fewer crumbs, non-gummy crumb), improved palatability or flavor.

The amylase can increase the content of soluble sugars, and these can interact further with the components of the dough, e.g. water, amylose, amylopectin and protein. This may give other advantageous effects such as improved water distribution in the dough, improved keeping qualities at freezing, improved ability to be heated in microwave oven.

The addition of said amylase results in retarding the staling phenomena in baked products during storage, such as crumb firming and decrease of crumb elasticity.

The addition of the amylase may also result in an increased strength, improved extensibility or elasticity, stability and reduced stickiness of the dough, thus resulting in improved machinability, as well as an increased volume and an improved crumb structure and softness of the baked product. The effect on the dough may be particularly advantageous when a poor quality flour is used. The improved machinability is of particular importance in connection with dough which is to be processed industrially.

DETAILED DESCRIPTION OF THE INVENTION

Amylase Properties

The amylase used in this invention hydrolyzes starch to form an initial hydrolysis product which comprises maltotriose(G3) in an amount which is at least 20% (particularly at least 50% or at least 75%) of the total amount of maltooligosaccharides. In this context, maltooligosaccharides refers to saccharides generally consisting of 2–10 glucose units (G2–G10) linked by alpha-1,4-bonds.

The initial hydrolysis product can be determined by letting the amylase act on starch (e.g. soluble wheat starch in a 1.7% solution by weight) at suitable conditions (e.g. 10 minutes at 60° C., pH 5.5) with a suitable dosage of amylase so as to form 3–7% (by weight) of maltooligosaccharides and analyzing the composition of maltooligosaccharides (e.g. by HPLC). The test may be carried out as described in C. Christophersen et al., Starch 50 (1), 39–45 (1998).

The amylase used in this invention hydrolyzes amylose (e.g. wheat amylose or synthetic amylose) so that the average molecular weight of the amylose after 0.4–4% hydrolysis (i.e. between 0.4–4% hydrolysis of the total number of bonds) is more than 50% (particularly more than 75%) of the value before the hydrolysis. The hydrolysis can be conducted at the conditions described above, and the molecular weight distribution before and after the hydrolysis can be determined by HPLC. The test may be carried out as described in C. Christophersen et al., Starch 50 (1), 39–45 (1998).

The amylase may be one that has activity on raw starch.

The amylase may have a temperature optimum in the range of 55–95° C., particularly 55–85° C., e.g. 60–75° C. in the presence of starch. The temperature optimum may be determined in a 1% solution of soluble wheat starch at pH 5.5 by measuring over 10 minutes.

The amylase may have optimum activity at a pH in the range of 3.5–7, particularly 4.5–6. The pH optimum may be measured in a 1% solution of soluble starch using Britton-Robinson buffer.

Further, the amylase may have a high activity in dough at low water content representative of dough. More specifically, the amylase activity in a 57:43 mixture of starch and water is more than 50% of the activity in a 50:50 mixture. The activity may be measured by heating a homogenous wheat starch slurry containing the enzyme from 25° C. to app. 100° C. (min. 95° C.) over 20 minutes, and extracting the maltooligosaccharides from the produced gel. A simple HPLC analysis of the composition can be used for quantifying the maltooligosaccharides formed. The heating may be carried out in a water bath, a DSC cell or by a microwave oven equipped with a temperature sensor control device. pH should be between 4.5–6.0 in the test.

Also, the amylase may be one that is not inhibited by the presence of calcium ions. The amylase may be one that is stabilized by calcium ions, or it may be calcium-independent. More specifically, the amylase activity in the presence of 10 mM $Ca^{++}$ should be at least 75% of the activity in the absence of $Ca^{++}$.

The amylase may be added in an amount corresponding to 0.05–50 mg enzyme protein per kg of flour, particularly 0.2–10 mg per kg.

The amylase may be non-liquefying. This can be determined by letting the amylase act on a 1% wheat starch solution until the reaction is complete, i.e. addition of fresh enzyme causes no further degradation, and analyzing the reaction products, e.g. by HPLC. Typical reaction conditions are e.g. 0.01 mg enzyme per ml starch solution for 48 hours. The amylase is considered non-liquefying if the amount of residual starch after the reaction is at least 20% of the initial amount of starch.

Amylases

The amylase may be a G2–G3 forming amylase which hydrolyzes starch to form maltose and maltotriose as initial main products. Such an amylase may be obtained from a strain of Actinomycetales, e.g. Streptosporangineae, Micromonosporineae or Pseudonocardineae, such as Thermomonosporaceae, Micromonosporaceae or Pseudonocardiaceae, specifically Thermomonospora, Micromonospora or Saccharomonospora, more specifically *T. curvata, T. vindis, M. melanosporea* or *S. viridis*. Y. Suzuki, T. Nagayama, H. Nakano, K. Oishi starch/Stärke 39 (1987) Nr. 6 pp 211–214. Y. Suzuki, T. Nagayama, H. Nakano, K. Oishi starch/Stärke 39 (1987) Nr. 7 pp 246–252. Y. Muramatsu , K. Takahashi, N. Nakamura (1993) Starch/Stärke, Nr. 3, pp. 99–104. B. S. Collins, C. T. Kelly, W. M. Fogarty, E. M Doyle (1993) Applied Microbiology and Biotechnology, 29: 31–25. B. W. M. Fogarty, B. S. Collins, E. M. Doyle, C. T. Kelly, Journal of Industrial Microbiology (1993) 11: 199–204. C. T. Kelly, B. S. Collins, W. M. Fogarty, E. D. Doyle Applied Microbiology and Biotechnology (1993) 39: 599–603.

A G2–G3 (maltose-maltotriose) producing amylase may be obtained from a strain of Bacillus, such as *B. thermoamyloliquefaciens* or *B. stearothermophilus*, e.g. *B. stearothermophilus* strain B-1 (FERM P-2440) as described in JP-A (Tokkai Hei) 3-103177. Strain B-1 was deposited on Jun. 30, 1989 at the National Institute of Bioscience and Human-Technology, Agency of Industrial Science and Technology, Ministry of International Trade and Industry, 1–3 Higashi 1-chome, Tsukuba-shi, Ibaraki-ken, Japan, and was converted on May 26, 1989, to an international deposit under the terms of the Budapest Treaty under the deposit No. FERM BP-2440.

A G3 (maltotriose) forming amylase may be obtained from *Streptococcus bovis*. or *Thermomonospora fusca*. Satoh, E; Uchimara, T, Kudo, T; Komagat, K Applied and Environmental Microbiology Vol 63, No 12, pp. 4941–4944, 1997. Busch J E, Stutzenberger F J World Journal of Microbiology and Biotechnology Vol 13, No 6, pp. 637–642., 1997.

Dough

The dough of the invention generally comprises wheat meal or wheat flour and/or other types of meal, flour or starch such as corn flour, corn starch, rye meal, rye flour, oat flour, oat meal, soy flour, sorghum meal, sorghum flour, rice starch, rice flour, potato meal, potato flour or potato starch.

The dough of the invention may be fresh, frozen or par-baked. The dough of the invention may be fresh or par-baked, i.e. the dough may be baked without being frozen.

The dough of the invention is normally a leavened dough or a dough to be subjected to leavening. The dough may be leavened in various ways, such as by adding chemical leavening agents, e.g., sodium bicarbonate or by adding a leaven (fermenting dough). Thus, the dough may be leavened by adding a suitable yeast culture, such as a culture of *Saccharomyces cerevisiae* (baker's yeast), e.g. a commercially available strain of *S. cerevisiae*.

The dough may also comprise other conventional dough ingredients, e.g.: proteins, such as milk or milk powder, gluten, and soy; eggs (either whole eggs, egg yolks or egg whites); shortening such as granulated fat or oil; an oxidant such as ascorbic acid, potassium bromate, potassium iodate, azodicarbonamide (ADA) or ammonium persulfate; a reducing agent such as L-cysteine; a sugar; a salt such as sodium chloride, calcium acetate, sodium sulfate or calcium sulfate. The dough may further comprise an emulsifier such as mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids, lecithin and lysolecithin.

Additional enzyme

Optionally, a second enzyme may be added to the dough. The additional enzyme may be a second amylase, such as an amyloglucosidase, an alpha-amylase, a beta-amylase, a cyclodextrin glucanotransferase or a branching enzyme, or the additional enzyme may be a peptidase, in particular, an exopeptidase, a transglutaminase, a lipase, a phospholipase, a cellulase, a hemicellulase, in particular a pentosanase such as xylanase, a protease, a protein disulfide isomerase, e.g., a protein disulfide isomerase as disclosed in WO 95/00636, and an oxidoreductase, e.g., a peroxidase, a laccase, a glucose oxidase, a pyranose oxidase, a lipoxygenase, an Lamino acid oxidase or a carbohydrate oxidase.

The additional enzyme may be of any origin, including mammalian plant, and microbial (bacterial, yeast or fungal) origin and may be obtained by techniques conventionally used in the art.

A phospholipase $A_1$ or $A_2$ may be added together with the amylase to improve the softness in the initial period after baking, particularly the first 24 hours after baking, as described in WO 99/53769, so that bread made by the combined use of an anti-staling amylase and a phospholipase has improved softness, both when eaten on the same day and when stored for several days after baking. There is no significant change in the taste or smell of the baked product.

The second amylase may be derived from a bacterium or a fungus, in particular from a strain of Aspergillus, e.g. a strain of *A. niger* or *A. oryzae*, or from a strain of Bacillus. Commercially available alpha-amylases useful for the present purpose include *Aspergillus oryzae* alpha-amylase (such as Fungamyl®, available from Novo Nordisk A/S, Denmark), and a *Bacillus amyloliquefaciens* alpha-amylase (such as BAN™, available from Novo Nordisk A/S, Denmark). The amyloglucosidase may be an *A. niger* amyloglucosidase (such as AMG™, available from Novo Nordisk A/S, Denmark). Other useful amylase products include Grindamyle® A 1000 or A 5000 (available from Grindsted Products, Denmark) and Amylase® H or Amylase® P (available from Gist-Brocades, The Netherlands).

The glucose oxidase may be a fungal glucose oxidase, in particular an *Aspergillus niger* glucose oxidase (such as Gluzyme®, available from Novo Nordisk A/S, Denmark).

The protease may in particular be Neutrase® (available from Novo Nordisk A/S, Denmark).

The lipase may be derived from a strain of Thermomyces (Humicola), Rhizomucor, Candida, Aspergillus, Rhizopus, or Pseudomonas, in particular from *Thermomyces lanuginosus (Humicola lanuginosa), Rhizomucor miehei, Candida antarctica, Aspergillus niger, Rhizopus delemar* or *Rhizopus arrhizus* or *Pseudomonas cepacia*. In specific embodiments, the lipase may be Lipase A or Lipase B derived from *Candida antarctica* as described in WO 88/02775, or the lipase may be derived from *Rhizomucor miehei* as described in EP 238,023, or *Humicola lanuginosa* described in EP 305,216, or *Pseudomonas cepacia* as described in EP 214, 761 and WO 89/01032.

Baked product

The process of the invention may be used for any kind of baked product prepared from dough, either of a soft or a crisp character, either of a white, light or dark type. Examples are bread (in particular white, whole-meal or rye bread), typically in the form of loaves or rolls, French baguette-type bread, pita bread, tortillas, cakes, pancakes, biscuits, cookies, muffins, pie crusts, crisp bread, steamed bread, pizza and the like.

Pre-mix

The present invention further relates to a pre-mix comprising flour and the amylase used in the invention. The pre-mix may contain other dough-improving and/or bread-improving additives, e.g. any of the additives, including enzymes, mentioned above.

Baking additive

The invention provides an enzymatic baking additive in the form of a granulate or agglomerated powder, which comprises the amylase described above. The baking additive may have a narrow particle size distribution with more than 95% (by weight) of the particles in the range from 25 to 500 μm.

Granulates and agglomerated powders may be prepared by conventional methods, e.g. by spraying the amylase onto a carrier in a fluid-bed granulator. The carrier may consist of particulate cores having a suitable particle size. The carrier may be soluble or insoluble, e.g. a salt (such as NaCl or sodium sulfate), a sugar (such as sucrose or lactose), a sugar alcohol (such as sorbitol), starch, rice, corn grits, or soy.

Determination of the Effect of Amylases According to the Invention

According to the present invention the effect of adding an amylase may be tested in dough and breads as described below.

Preparation of White Bread (I)

The straight-dough bread-making method may be used according to AACC Method 10–10B (in Approved Methods of the American Association of Cereal Chemists, Ninth Edition, March 1995; AACC, St. Paul Minn., USA).

| Basic recipe | |
|---|---|
| Wheat flour | 100% |
| Salt | 1.5% |

| -continued | | |
|---|---|---|
| Basic recipe | | |
| Yeast (fresh | 4.0% | |
| Sugar | 1.5% | |
| Water | 61% | (determined by farinograph) |

All percentages are by weight relative to the wheat flour.

Procedure
1. Dough mixing (Spiral mixer):
    2 min. at low speed
    5 min. at high speed
    The mixing time is determined and adjusted by the skilled baker so as to obtain an optimum dough consistency under the testing conditions used.
2. 1st proof: 25 min. at room temperature (about 22° C.), covered by a cloth
3. Scaling and shaping
4. Final proof: 55 min at 32° C., 82% RH
5. Baking: 235° C., 22 min. for rolls and 35 min for loaf.

| Preparation of White Bread (II), Toast recipe | |
|---|---|
| Water | 60% |
| Flour | 100% |
| Yeast | 4% |
| Salt | 2% |
| Sugar | 3% |
| Shortening | 1½% |

All percentages are by weight relative to the wheat flour.

Procedure:
   Mixing low gear, 3 minutes ↓
   Mixing high gear, 3½ minutes ↓
   Evaluation on table, 7 minutes ↓
   fermentation on table, 15 minutes ↓
   Dividing/scaling, 350 g pr. loaf, 3 minutes ↓
   sheeting/molding, 3 minutes ↓
   Relaxing on table, 5 minutes ↓
   Folding, 2 minutes ↓
   Relaxing on table, 5 minutes ↓
   sheeting/molding, 2 minutes ↓
   fermentation, bread 32° C., 45 minutes ↓
   Baking bread 230° C., 35 minutes Preparation of White Bread (III)

The sponge-dough bread-making method may be used according to AACC Method 10–11 (in Approved Methods of the American Association of Cereal Chemists, Ninth Edition, March 1995; AACC, St. Paul Minn., USA).

| Basic recipe for Sponge | |
|---|---|
| Wheat flour | 60% |
| Yeast (compressed) | 36% |
| Yeast Food | 2% |
| Water | 36% |

All percentages are by weight relative to the wheat flour.

Procedure
1. Add water to compressed yeast
2. Add yeast food in dry form with flour 3. Mix sponge (Hobart A-120; Hobart Corp., Troy Ohio, USA):
0.5 min. at $1^{st}$ speed
1 min. at $2^{nd}$ speed The mixing time is determined and adjusted by the skilled baker so as to obtain an optimum dough consistency under the testing conditions used.

4. Ferment in a fermentation cabinet: 4 hours at 30° C., 85% RH

| Basic recipe for Dough | |
|---|---|
| Wheat flour | 40% |
| Water | 24% |
| Sugar | 5.0% |
| Shortening | 3.0% |
| Salt | 2.0% |

All percentages are by weight relative to the wheat flour.

Procedure

1. Add dough ingredients; begin mixer ($1^{st}$ speed)
2. Add sponge in three approximately equal portions at 15, 25, and 35 seconds mixing time; total mixing time: 1 min
3. At $2^{nd}$ speed, mix to obtain an optimum dough consistency
4. Ferment in a fermentation cabinet: 30 min at 30° C., 85% RH
5. Intermediate proof: 12–15 min in fermentation cabinet
6. Mold and final proof at 35.5° C., 92% RH
7. Bake: 25 min at 218° C.

Evaluation of Staling Properties of Bread

Bread is allowed to cool, wrapped and sealed in double plastic bags and stored at room temperature until texture analysis on day 0 up to e.g. day 9.

The degree of staling is determined on bread, e.g. on day 1, 3, 7 and 9 after baking. Evaluation of staleness and texture can be done according to AACC method 74-09. Data is evaluated by statistical programs, e.g. Statgraphics or SAS. The principles for determination of softness and elasticity of bread crumb are as follows:

1. A slice of bread is compressed with a constant speed in a texture analyzer, measuring the force for compression
2. The softness of the crumb is measured as the force at e.g. 25% compression.

The force at (e.g.) 40% compression (P2) and after keeping 40% compression constant for 30 sec. (P3) is measured and the ratio (P3/P2) is the elasticity of the crumb.

Preparation of White Layer Cake

The method may be used according to AACC Method 10–90 (in Approved Methods of the American Association of Cereal Chemists, Ninth Edition, March 1995; AACC, St. Paul Minn., USA).

| Basic recipe | |
|---|---|
| Flour | 100% |
| Sugar | 140% |
| Shortening | 50% |
| Nonfat Dry Milk | 12% |
| Dried Egg Whites | 9% |
| Salt | 3% |
| Baking Powder and Water determined empirically | |

All percentages are by weight relative to the flour.

Procedure

1. Combine all dry ingredients and sift well
2. Add shortening and 60% of water
3. Mix at low speed for 0.5 min in Hobart C-100 mixer
4. Mix at medium speed for 4 min
5. Add 50% of remaining water
6. Mix at low speed for 0.5 min, scrape down and mix at medium speed for 2 min
7. Add remaining water, mix at low speed for 0.5 min, scrape down and mix at medium speed for 2 min
8. Scale batter into each of two greased pans
9. Bake at 375° C. or 350° C.

Evaluation of Cakes

Cakes should be graded for volume and texture on the same day as baked and can be done by the method according to AACC Method 10–90, and repeated after a suitable time, e.g. 14 days.

The internal structure may be scored for the uniformity and size of cells as well as thickness of the walls; the grain; texture, such as moisture, tenderness and softness; crumb color; and flavor.

Example

Bread with and without enzyme is baked according to the above recipe and procedure: The firmness and elasticity of the bread are followed during aging of the bread.

What is claimed is:

1. A process for preparing a dough, said process comprising adding a first amylase to the dough in an amount which is effective to retard the staling of a baked product prepared from the dough, wherein said first amylase:

a) hydrolyzes starch to form an initial hydrolysis product which comprises maltotriose in a relative amount which is at least 20% of the total maltooligosaccharides of 2–10 glucose units, b) hydrolyzes amylose so that the average molecular weight of the amylose after 0.4–4% hydrolysis is more than 50% of the molecular weight before the hydrolysis, and c) has a temperature optimum in the range of 55–95° C. in the presence of starch.

2. The process of claim 1 wherein the amylase is not inhibited by calcium ions.

3. The process of claim 1 wherein said relative amount of maltooligosaccharides is at least 50% of the total maltooligosaccharides of 2–10 glucose units.

4. The process of claim 1, wherein the amylase is non-liquefying.

5. The process of claim 1, wherein the amylase has optimum activity at a pH in the range pH 3.5–7.

6. The process of claim 1, wherein the amylase has an activity in a 57:43 starch : water mixture which is more than 50% of the activity in a 50:50 mixture.

7. The process of claim 1, wherein the amylase hydrolyzes amylose to form an initial hydrolysis product comprising maltose and maltotriose as main products.

8. The process of claim 7, wherein the amylase is from Actinomycetales, Micromonosporineae or Pseudonocardineae.

9. The process of claim 1 wherein the amylase hydrolyzes amylose to form maltotriose as a main product.

10. The process of claim 7 wherein the amylase is from Bacillus.

11. The process of claim 1, wherein the amylase is added in an amount corresponding to 0.05–50 mg enzyme protein per kg of flour.

12. The process of claim 1, further comprising adding an enzyme selected from the group consisting of a second amylase, a phospholipase, a cellulase, a hemi-cellulase, a pentosanase, a lipase, a peroxidase, a protease and an oxidase.

13. A process for the retardation of crumb firming in a baked product made from a dough, which process comprises the addition to the dough of an effective amount of an amylase which
 a) hydrolyzes starch to form an initial hydrolysis product which comprises maltotriose in an amount which is at least 20% of the total maltooligosaccharides of 2–10 glucose units,
 b) hydrolyzes amylose so that the average molecular weight of the amylose after 0.4–4% hydrolysis is more than 50% of the molecular weight before the hydrolysis, and
 c) has a temperature optimum in the range of 55–95° C. in the presence of starch.

14. A dough which comprises an amylase which:
 a) hydrolyzes starch to form an initial hydrolysis product which comprises maltotriose in an amount which is at least 20% of the total maltooligosaccharides of 2–10 glucose units,
 b) hydrolyzes amylose so that the average molecular weight of the amylose after 0.4–4% hydrolysis is more than 50% of the molecular weight before the hydrolysis, and
 c) has a temperature optimum in the range of 55–95° C. in the presence of starch.

15. A pre-mix for dough comprising flour and an amylase, wherein said amylase:
 a) hydrolyzes starch to form an initial hydrolysis product which comprises maltotriose in an amount which is at least 20% of the total maltooligosaccharides of 2–10 glucose units,
 b) hydrolyzes amylose so that the average molecular weight of the amylose after 0.44% hydrolysis is more than 50% of the molecular weight before the hydrolysis, and
 c) has a temperature optimum in the range of 55–95° C. in the presence of starch.

16. An enzymatic baking additive in the form of a granulate or agglomerated powder, which comprises an amylase which:
 a) hydrolyzes starch to form an initial hydrolysis product which comprises maltotriose in an amount which is at least 20% of the total maltooligosaccharides of 2–10 glucose units,
 b) hydrolyzes amylose so that the average molecular weight of the amylose after 0.44% hydrolysis is more than 50% of the molecular weight before the hydrolysis, and
 c) has a temperature optimum in the range of 55–95° C. in the presence of starch.

17. The additive of claim 16 wherein more than 95% (by weight) has a particle size between 25 and 500 μm.

18. An enzymatic baking additive, which comprises
 a) a phospholipase and
 b) an amylase which:
  i) hydrolyzes starch to form an initial hydrolysis product which comprises maltotriose in an amount which is at least 20% of the total maltooligosaccharides of 2–10 glucose units,
  ii) hydrolyzes amylose so that the average molecular weight of the amylose after 0.44% hydrolysis is more than 50% of the molecular weight before the hydrolysis, and
  iii) has a temperature optimum in the range of 55–95° C. in the presence of starch.

* * * * *